INVENTORS
Peter A. Lajoie and
Samuel S. Harbaugh.
BY John D. Mesaros
THEIR ATTORNEY

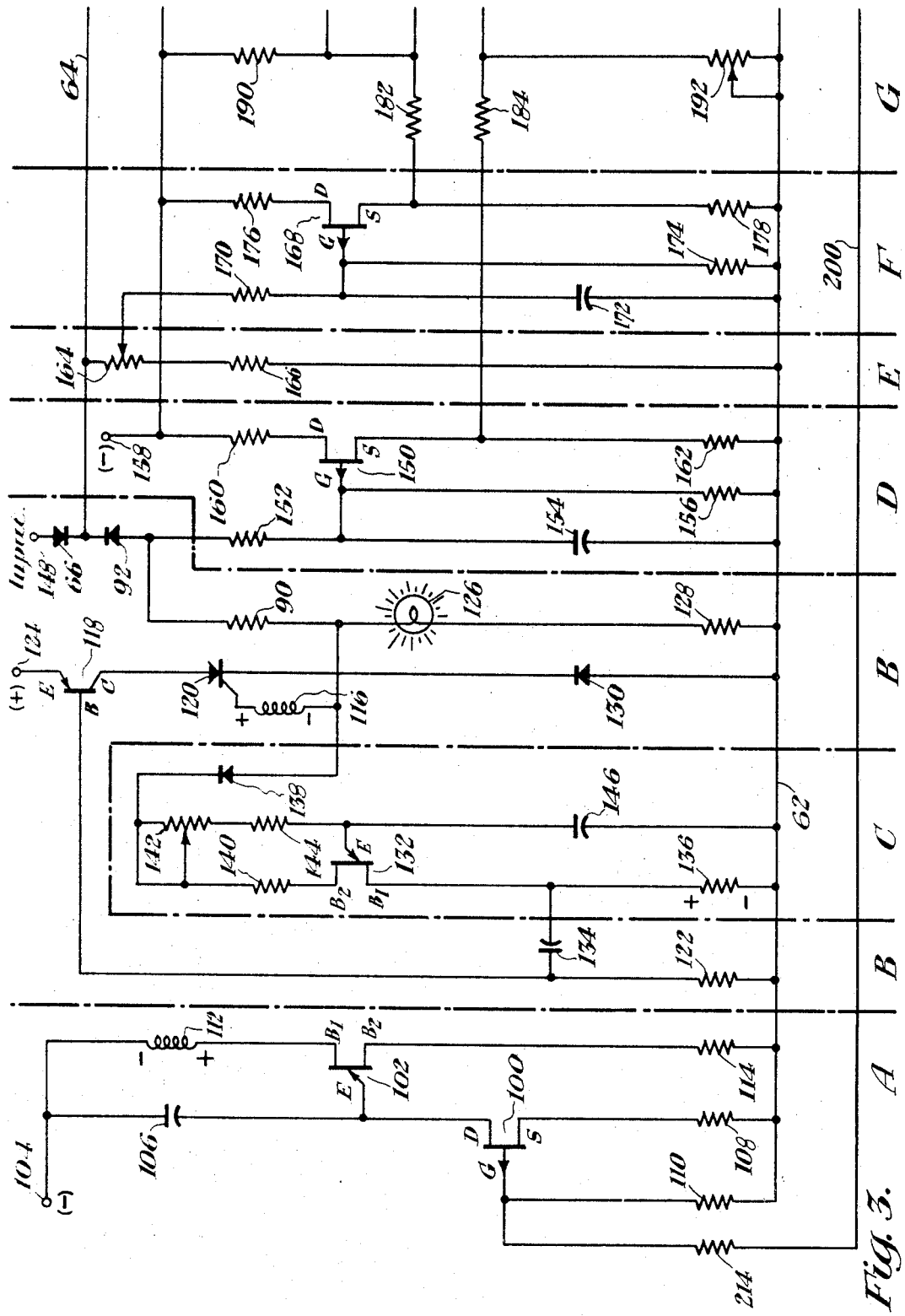

3,400,205
CONSUMABLE ELECTRODE CONTROL SYSTEM TO OVERCOME TEMPORARY ABNORMAL CONDITIONS
Peter A. Lajoie and Samuel S. Harbaugh, Natrona Heights, Pa., assignors to Allegheny Ludlum Steel Corporation, Brackenridge, Pa., a corporation of Pennsylvania
Filed Oct. 17, 1966, Ser. No. 587,167
10 Claims. (Cl. 13—13)

This invention relates to a control system for a consumable electrode furnace, and more particularly to an adjustable speed position regulator for a consumable electrode furnace.

As is known, consumable arc melting furnaces usually comprise an electrode of the metal to be melted extending downwardly into a mold or crucible which receives the molten metal and within which an ingot is formed. The electrode is connected to one terminal of a direct current voltage source, and means are provided for electrically connecting the other terminal of the source to the mold and, hence, to the molten metal. Usually, in starting the melt, a small supply of chips or the like is placed in the mold so that when the arc is struck the chips are melted to form an initial molten metal supply in the crucible mold. After the arc is initially struck, the arc is maintained between the electrode to be melted and the molten pool of metal beneath it, the electrode being melted due to the heat of the arc. As the electrode is melted, it is deposited in and forms the aforesaid molten pool, the bottom portion of which continuously solidifies as the electrode melts to form an ingot which increases in length, starting from the bottom upwardly. In this process, impurities float to and on the top of the molten pool, and assuming that the pool does not solidify during the formation of the ingot, the major portion of the impurities will be excluded from the main body of the ingot.

In any consumable electrode furnace, it is desirable to provide a constant and uniform melt rate in order to produce ingots of good quality. A constant melt rate, in turn, necessitates a fine control of the position of the electrode relative to the molten pool beneath it to maintain a more or less fixed arc gap. In most cases, electrical motors are employed to effect electrode movement, and these motors are controlled as a function of an electrical chracteristic of the arc which spans the distance between the bottom of the electrode and the molten pool beneath it. This characteristic is indicative of the arc length and may, for example, comprise arc gap voltage or recurring increases in impedance ("hash") of characteristic frequency superimposed on the impedance associated with base arc voltage and current. The hash effect and its application to control systems may be understood by reference to U.S. Patent Nos. 3,186,043 and 3,187,078, both of which issued on June 1, 1965 and are assigned to the assignee of the present application.

From the foregoing it will be appreciated that a control system for a consumable electrode furnace comprises a servo loop arrangement in which an electrical signal proportional to arc voltage, "hash" or the like, is applied to the drive motor as a control signal to maintain the arc gap constant or at least approximately constant. In many consumable electrode melting systems, regardless of whether "hash," arc voltage, or another characteristic of the arc is employed for control purposes, some slow oscillation of ram feed rate is sometimes noted, and often times the electrode stops feeding due to abnormal arc conditions which exist temporarily. In order to obtain uniform melting conditions, it is better to maintain some feed rate for the electrode near the long time average feed rate value. When "hash" is employed to control the electrode, the electrode feed rate is continuously adjusted by a hash count regulator in an effort to keep the hash count rate at a preset value. However, when a temporary abnormal arc condition occurs it produces a high hash count rate and the feed rate output of the hash rate regulator normally stops; whereas it is desirable for it to continue under such abnormal conditions.

It is accordingly an object of the present invention to provide a control system for a consumable electrode furnace which overcomes the foregoing and other disadvantages of prior art systems of this type.

It is another object of this invention to provide a control system for a consumable electrode furnace wherein the feed rate of the electrode can be controlled despite the occurrence of temporary abnormal arc conditions.

It is a further object of this invention to provide a control system for a consumable electrode furnace wherein the occurrence of a temporary abnormal arc condition will not suddenly effect a drastic change in the feed rate of the electrode.

It is still a further object of this invention to provide a new and improved control system for a consumable electrode furnace wherein bias control signals are superimposed on the electrode control signals and continue at a decreasing rate upon the cessation of the electrode control signals.

These and other objects of the invention ar accomplished by providing a pulse output which is proportional to an electrical characteristic of the arc and by providing a biasing circuit. The biasing circuit detects the pulse rate of the electrode control pulses and begins to produce bias pulses at an increasing rate until the rate reaches a predetermined proportion of the electrode control pulses, both sets of pulses then being mixed to control the movement of the electrode according to the total pulse output. Upon the cessation of the electrode control pulses due to an abnormal arc condition, the bias pulses continue at a decreasing rate, thus providing electrode control and electrode feed for a predetermined time period which usually is preset to be longer in duration than the existence of the abnormal arc condition. Thus the bias signal insures that should the main control signal fail because of abnormal arc conditions, the electrode will continue in its downward movement without interruption.

The above and other objects and features of the invention will become apparent from the following detailed description taken in connection with the accompanying drawings which form a part of this specification, and in which.

Figure 2:
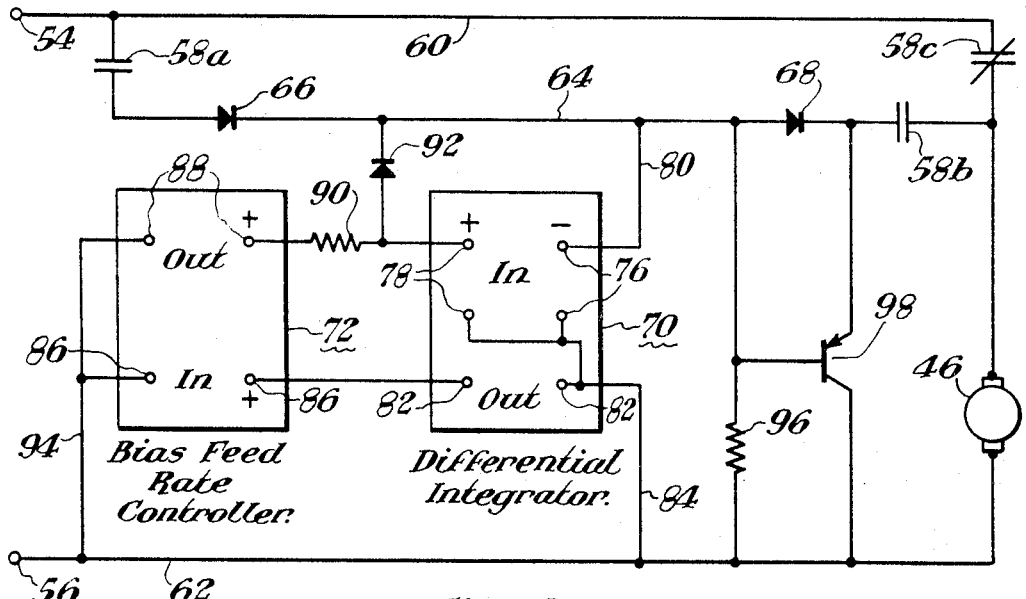
FIG. 2 is a block and schematic diagram of the circuity providing the bias pulse signals.
Figure 4:
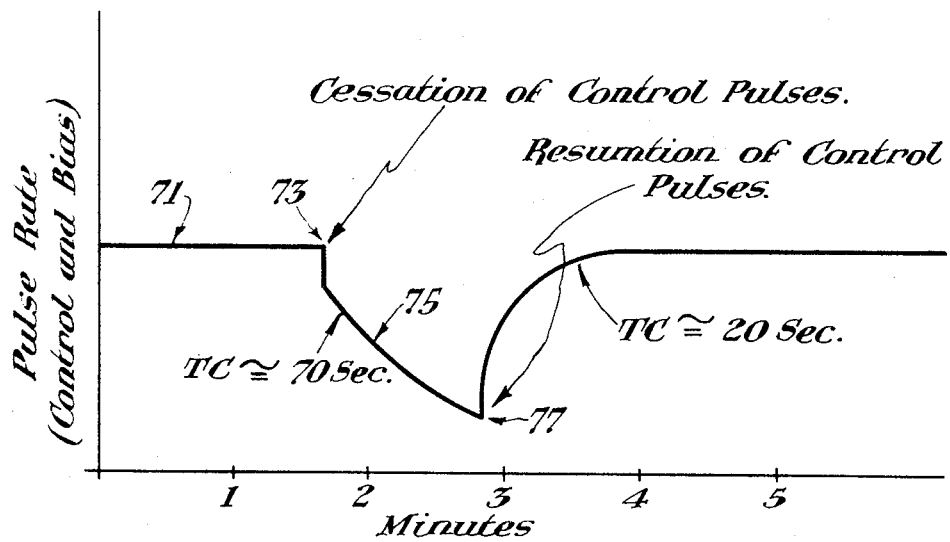
Figure 3A:
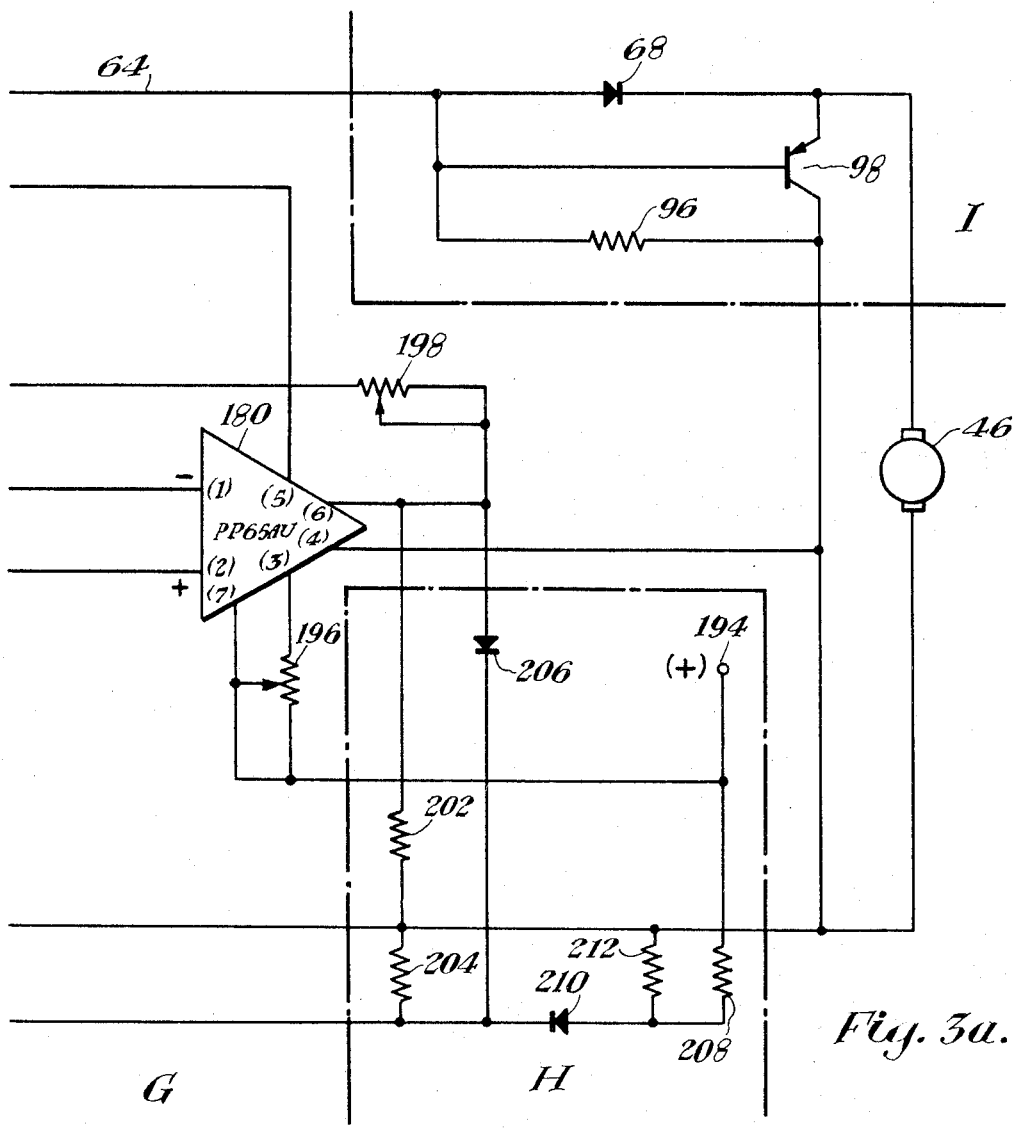

FIGS. 3 and 3a, placed side by side, show schematically the circuitry of FIG. 2; and FIG. 4 shows a graphical illustration of the pulse rate action.

Figure 1:
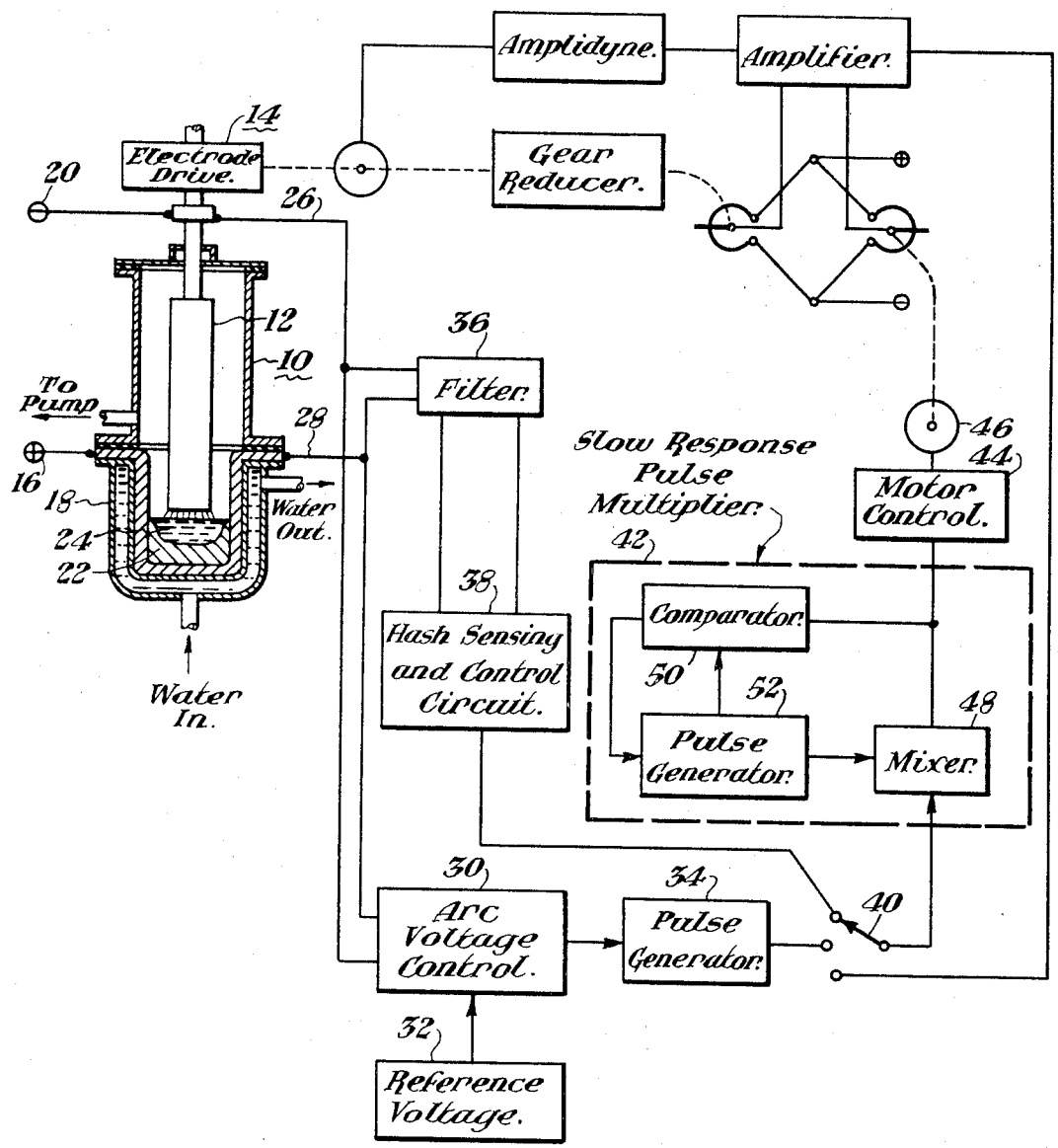
FIGURE 1 is a block and schematic circuit diagram of the control system of the invention.

Referring now to the drawings, and particularly to FIG. 1, a consumable electrode furnace is schematically illustrated and identified by the reference numeral 10. An electrode 12 which is formed of the metal to be melted is suspended therein and driven downwardly by electrode drive means generally designated 14. Power is supplied to the furnace by a positive terminal designated 16 which is connected to the conductive mold or crucible 18 forming the lower portion of the furnace 10. The negative power input terminal 20 is suitably connected to the electrode 12. Upon driving the electrode downwardly, an arc is formed between the crucible 18 and the electrode 12 and the melting commences to form an ingot 22 which is formed from a molten pool 24 adjacent the lower end of the electrode 12. Leads 26 and 28 are electrical connected to the electrode 12 and the crucible 18, respectively, to derive an electrical signal proportional to an electrical characteristic of the arc which may be voltage or electrical discontinuities superimposed upon the arc voltage and known as "hash."

The electrode control may take one of two forms, either arc voltage control, or hash control. In arc voltage control the arc voltage from leads 26 and 28 is fed into an arc voltage control unit 30 compared with the reference voltage 32 and the difference being utilized to generate pulses from a pulse generator 34, the pulse rate being proportional to the arc voltage. With hash control, the arc voltage from leads 26 and 28 is fed into a filter 36 and thence to a hash sensing and control circuit 38 which produces a pulse output wherein the pulse rate is proportional to the electrical discontinuities existing on the arc voltage. A switch 40 is provided to select either arc voltage control mode or hash control mode. From the switch 40 the pulses are fed into a slow response pulse multiplier 42, as shown in dotted lines, and interposed between the switch 40 and the motor controller 44 and the servomotor 46.

Inasmuch as the basic concept of this invention resides in the slow response pulse multiplier 42, a detailed discussion of the remainder of the circuitry is not necessary and the operation thereof may be understood by reference to U.S. Patent No. 3,187,077, issued June 1, 1965 and assigned to the assignee of the present application. The only difference between the aforesaid patent and the instant application is the addition of the pulse generator 34 for reasons which will hereinafter become obvious.

The slow response pulse multiplier 42 includes a mixer 48, a comparator 50, and a pulse generator 52. Upon the the initiation of pulses to the mixer 48 from either hash control or arc voltage control, the pulses are fed directly to the servomotor controller 44. This pulse signal is also fed into the comparator 50 which compares these pulses with the pulses originating from the pulse generator 52, which at this moment is providing zero pulses. The output of the comparator is then fed into the pulse generator 52 which initiates pulses in direct proportion to the comparator output. The comparator 50 is a slow response circuit and the pulse output of the pulse generator 52 increases in its rate as the comparator 50 slowly responds to its input. The output of the pulse generator 52 will, after the response time, be in direct proportion to the output from the hash control or the arc voltage control. These pulses from the pulse generator 52 are then fed into the mixer 48 which adds them to the original pulses to thereby operate the motor controller 44 at a faster rate.

The slow response pulse multiplier 42 is shown in partially schematic and partially block diagram form in FIG. 2. The servomotor 46 corresponds to that shown in FIG. 1. The motor controller 44 has been removed and is not necessary. The terminal designated 54 would correspond to the input to the slow response pulse multiplier 42 via switch 40 from the output pulses of either the hash control or the arc voltage control. A relay (not shown) having normally open contacts 58a and 58b, and normally closed contacts 58c, is provided to permit selective operation of the electrode control system with or without the slow response pulse multiplier 42. The terminal designated 56 would correspond to a common or ground connection for the circuitry illustrated. A lead 60 is connected to the terminal 54 and connected in series therewith is the relay contact 58c to motor controller 44, the output of which is connected to the servomotor 46 and thence to the ground terminal 56 by means of lead 62. A second path of energization for the motor controller 44 is provided in parallel with relay contact 58c from lead 60 through normally opened relay contact 58a through diode 66 through lead 64 through diode 68 through normally opened relay contact 58b to the motor 46.

A differential integrator circuit 70 and a bias feed rate controller circuit 72 (both shown in block form) are provided. The differential integrator 70 has a first pair of input terminals 76 and a second pair of input terminals 78, the first pair being denoted with a minus (—) sign and the second pair of terminals being designated with a plus (+) sign, the purposes of which will hereinafter become obvious. A lead 80 is provided from the minus (—) terminal to lead 64 intermediate the diodes 66 and 68. Output terminals 82 are provided for the differential integrator, one of the terminals being connected to ground lead 62 by means of lead 84 and the other output terminal being connected to the plus (+) side of the input terminals 86 of the bias feed rate controller 72. The two ground terminals for the input terminals 76 and 78 of differential integrator 70 are tied together and connected to the ground by means of lead 84. Connected between the positive terminal of output terminals 88 of bias feed rate controller 72 and the positive terminal of input terminals 78 of differential integrator 70 is a resistor 90. A diode 92 is connected between the positive terminal of input terminals 78 and lead 64 intermediate diode 66 and the connecting point for lead 80. A lead 94 connected to the ground 62 is electrically connected to the ground terminals of input terminnals 86 and output terminals 88 of bias feed rate controller 72. A transistor 98 has its emitter connected to lead 64 intermediate diode 68 and relay contact 58b, its collector connected to ground lead 62 and its base connected to lead 64 intermediate the point of connection of lead 80 and diode 68. A bias resistor 96 is connected between the base of the transistor 98 and the ground lead 62.

The mixer 48 (shown in FIG. 1) comprises the diodes 66 and 92 of FIG. 2. The comparator 50 would correspond to the differential integrator 70, and the pulse generator 52 will correspond to the bias feed rate controller 72.

In operation with the hash control circuit operating as shown in FIG. 1, the pulses from the hash regulator would appear at terminal 54 and be transmitted through leads 60 through closed relay contact 58c to motor controller 44 to thereby energize the servomotor 46. In the event that automatic bias feed rate is desired, a relay 58 (not shown) is energized, thereby opening relay contact 58c and closing relay contacts 58a and 58b. The pulses from the hash regulator are then fed through closed relay contact 58a through diode 66 which serves as a blocking diode to prevent the output of the bias feed rate from affecting the hash regulator. The pulses would then be transmitted through lead 64 through diode 68 through closed relay contact 58b to cause rotation of the servomotor 46. At this point the bias feed rate controller 72 (shown in block form) is in its quiescent state and has no output. The pulse output through diode 66 is also transmitted from lead 64 through lead 80 to the differential integrator 70 (shown in block form). The pulses to the differential integrator 70 are fed into the negative input terminals 76 and appear as a decaying D.C. voltage which provides an output at terminals 82 similar to the input, but on an amplified basis and with a built-in inertia. This output appears at terminals 86 of bias feed rate controller 72 to initiate the generation of pulses, the pulse rate being proportional to the amplitude of the output from terminals 82 of the differential integrator 70. These pulses provide an output at terminals 88 of bias feed rate controller 72 through resistor 90 through diode 92 to lead 64 through diode 68 through closed relay contact 58b to the servomotor 46. These pulses are added to the pulses of the hash regulator to thereby drive motor 46 faster. The output pulses from bias feed rate controller 72 are also transmitted through resistor 90 to input terminals 78 of the differential integrator 70. As can be seen, the input terminals 78 are designated positive (+) and the input terminals 76 of differential integrator are designated negative (—). The negative input terminals 76 receive the total pulses appearing on lead 64, which in this case would be the pulses from the hash regulator plus the pulses provided by the bias feed rate controller 72. The pulses appearing at positive terminals 78 would be only the pulses from the bias feed rate controller 72. These pulses are then compared in the differential integrator 70 to provide a D.C. voltage output at terminals 82, the amplitude of which would be proportional to the comparison or difference of the pulses. Consequently, the pulses to input terminals 76 must be different from the pulses to input terminals 78. A positive reference voltage is established in the bias feed rate controller 72 and this reference voltage is increased or decreased by the D.C. voltage appearing at the input terminals 86 from the output at terminals 82 of differential integrator 70. The pulses appearing at positive terminals 78 of differential integrator 70 tend to drive the output D.C. voltage at terminals 82 more positive, while the pulses appearing at negative input terminals 76 tend to drive the output at terminals 82 less positive. Consequently, the D.C. voltage appearing at output terminals 82 would be proportional to the difference in voltage levels of the inputs to thereby affect the pulse rate of the bias feed rate controller 72. Diode 92 serves as a blocking diode to prevent pulses from the hash regulator through diode 66 from interfering with the input at terminals 78 of differential integrator 70.

When pulses from the hash regulator are reduced to zero, due to the inertia in the differential integrator 70, pulses still appear at the input terminals 76 thereof, which pulses come from the bias feed rate controller 72. However, the same pulses are also appearing at input terminals 78 of differential integrator 70, and consequently the output at terminals 82 will eventually be reduced to zero, thereby causing the cessation of pulses from bias feed rate controller 72. FIG. 4 shows this graphically with the line designated 71 showing steady state pulse rate from the "control" pulses plus the bias pulses. At point 73, with the cessation of control pulses the pulse rate drops immediately by that amount but the bias pulses decay as shown by the curve 75. With the resumption of control pulses at point 77 the pulse rate increases immediately by that amount and the total pulse rate then builds up. The time constants (TC) indicated are representative values. The bias pulses illustrated provide approximately 80% of the total pulse rate to drive the servomotor 46.

Upon the cessation of pulses, normally the motor 46 would coast and provide a back EMF which could do harm to the circuit, however, blocking diode 68 is provided to prevent this back EMF from being fed into differential integrator 70. The transistor 98 is included to provide a conductive path in parallel with motor 46. Resistor 96 forward biases transistor 98 during the back EMF, however, diode 68 causes transistor 98 to be reverse biased during a pulse from the controller. This back EMF drives the current from motor 46 through closed relay contact 58b through lead 64 through the emitter of transistor 98 through the collector, through lead 62 to the other terminal of the motor, thereby dissipating the energy from the back EMF of the motor to provide dynamic braking of the motor 46.

FIG. 3 shows a detailed circuit diagram of the block and schematic diagram of FIG. 2. Portions of the circuit have been delineated by dashed lines according to function in order to simplify the description of the circuit and each delineated portion has been designated by a letter. The portion designated A is a unijunction relaxation oscillator utilizing a field effect transistor 100 as a voltage controlled charging source. This portion includes the field effect transistor 100 and the unijunction transistor 102. A capacitor 106 is connected between a negative power source terminal 104 and the drain terminal D of transistor 100. A resistor 108 is connected between the source terminals of transistor 100 and the common lead 62. The load resistor 110 is connected between the gate terminal G of transistor 100 and the common lead 62. A transformer primary winding 112 is connected between power terminal 104 and the base B1 of transistor 102 with the emitter E thereof being tied to the drain terminal D of transistor 100. A resistor 114 is connected between the base B2 of transistor 102 and the common lead 62.

The portion designated B is a power switch including the transformer secondary winding 116 and consisting of PNP transistor 118 and a silicon controlled rectifier 120. The base terminal B of transistor 118 is connected through a resistor 122 to the common lead 62, while the emitter E thereof is connected to a positive voltage source 124. The collector C is connected to the anode of the silicon controlled rectifier 120, while the cathode thereof is connected through an indicating lamp 126 and a resistor 128 to the common lead 62. A diode 130 having its anode connected to the common lead 62 is connected in parallel with the indicating lamp 126 and the resistor 128. The secondary transformer winding 116 is connected between the gate and the cathode of the silicon controlled rectifier 120. The cathode of silicon controlled rectifier 120 is connected through resistor 90 to the anode of diode 92, the cathode of which is connected to lead 64. Another diode 66 has its cathode connected to lead 64 and its anode connected to input terminal 148.

The portion designated C is a typical unijunction relaxation oscillator which includes unijunction transistor 132, the base B1 thereof being coupled to the base B of transistor 118 by means of capacitor 134. The base B1 is also connected to the common lead 62 through a resistor 136. The anode of a diode 138 is connected to the cathode of the silicon controlled rectifier 120, and the cathode of diode 138 is connected through resistor 140 to the base B2 of transistor 132.

The cathode of diode 138 is also connected through resistors 142 and 144 in series therewith to the emitter E of transistor 132. The emitter E is also connected to the common lead 62 through capacitor 146. Resistor 142 is made adjustable to vary the input signal to transistor 132.

The portion of the circuit designated D is a first long time constant integrator which includes a field effect transistor 150. A resistor 152 is connected between the gate terminal G of transistor 150 and the anode of diode 92. A capacitor 154 and a resistor 156 are connected in parallel and connect the gate terminal G of transistor 150 to the common lead 62. Power is provided to the transistor 150 from a negative power source 158 through resistor 160 to the drain terminal D of transistor 150, while the source terminal S is connected to the common lead 62 through resistor 162.

The portion designated E is a percentage control which includes a variable resistor 164 in series with a resistor 166 connected between leads 64 and 62. This provides a voltage divider from the center movable tap of resistor 164.

The portion of the circuit designated F is a second long time constant integrator similar to section C and includes a field effect transistor 168 having its gate terminal G connected to the movable tap of resistor 164 through resistor 170. A capacitor 172 and a resistor 174 are connected in parallel and the parallel circuit is connected between the common lead 62 and the gate terminal G of transistor 168. A resistor 176 connects the drain terminal D to the power terminal 158, while a resistor 178 connects the source terminal S to the common lead 62.

The portion of the circuit designated G is a typical differential operational amplifier which includes a differential amplifier 180 having seven terminals and is of the standard type, such as, Philbrick Model No. PP65AU. The amplifier 180 contains an input terminal 1 designated negative (−) and a second input terminal 2 designated positive (+). Input terminal 1 is connected to the source terminal S of transistor 168 through resistor 182, and input terminal 2 is connected to source terminal S of transistor 150 through resistor 184. Input terminal 1 is connected to negative power terminal 158 through resistor 190, and terminal 2 is connected to common lead 62 through adjustable resistor 192. The negative power terminal 158 is also connected directly to terminal 5 of the differential amplifier 180, while terminal 3 is connected to positive power input terminal 194 through variable resistor 196. Terminal 7 of the differential amplifier 180 is connected to the movable tap of resistor 196. A variable resistor 198 connects input terminal 1 with output terminal 6 of the differential amplifier 180, while terminal 4 is connected directly to common lead 62. The portion of the circuit designated H is a limiting circuit which keeps the output of the differential amplifier 180 at a value above zero. A resistor 202 connects the output terminal 6 of differential amplifier 180 with the common lead 62 and a resistor 204 is connected between the common lead 62 and the output lead 200. A diode 206 has its anode connected to the output terminal 6 of differential amplifier 180 and its cathode connected to output lead 200. A resistor 208 is connected between the power input terminal 194 and the anode of diode 210. A resistor 212 connects the anode of diode 210 to the common lead 62. The cathode of diode 210 is connected to the cathode of diode 206.

The portion of the circuit designated I provides the dynamic brake for the motor 46, and this circuit includes the transistor 98, resistor 96, and the diode 68, which were previously discussed in connection with FIG. 2. The operation of the system can be described in detail with reference to FIG. 3. A pulse from the hash regulator appears at input terminal 148 through diode 66 through lead 64 through diode 68 to servomotor 46, thereby driving the electrode downwardly. This pulse appears on lead 64 as an increase in voltage across resistors 164 and 166 which are connected in series to ground lead C. Resistor 164 is made variable to provide a percentage control which sets the pulse amplitude level transmitter to the long time constant integrator F. Connected between the variable tap of resistor 164 and ground lead C is a resistor 170 in series with capacitor 172. Connected in parallel with capacitor 122 is a second resistor 174. Resistors 170 and 174 and capacitor 172 act as a long time constant integrator with field effect transistor 168 which has a high input impedance and is used to eliminate resistance effect on the integrator circuit. The input pulse charges capacitor 172 which then slowly discharges through resistor 174. During the charge and discharge cycle, gate terminal G of transistor 168 becomes more positive with respect to ground lead C. As the gate terminal G becomes more positive, so does source terminal S of transistor 168. Source terminal S of transistor 168 provides a D.C. output which is proportional to the pulse rate from the percentage control resistor 164. This output is fed through resistor 182 to the inverting negative input terminal (−) of the differential amplifier 180. The output of differential amplifier 180 at terminal 6 thereof becomes more negative by some gain factor determined by the value of resistor 182 connected in series with the input terminal and resistor 198 connected in parallel between the input and output terminal. This provides a more negative but still positive D.C. voltage at the output terminal 6. This output voltage is fed through diode 206 to lead 200. A fixed D.C. voltage is added here by the limiting circuit H which keeps the amplifier output at a value above zero. A positive D.C. voltage is applied from power terminal 194 through resistor 208 through diode 210 to lead 200. A current limiting resistor 212 is connected between the ground lead C and the connecting point between diode 210 and resistor 208. Diodes 206 and 210 act as a mixer for combining the outputs of the differential amplifier 180 and the limiting circuit H, the combined voltages providing an input to section A of the circuit.

This input voltage is transmitted through lead 200 through current limiting resistor 214 through the gate terminal G of field effect transistor 100. Section A in effect provides a voltage to frequency converter in which the generated frequency is directly proportional to the input voltage signal. The field effect transistor 100 and its biasing components are used as a voltage controlled charging source for the capacitor 106. The transistor 100 is used in the reverse bias mode to provide complete current cutoff to the capacitor 106, resulting in a reliable zero frequency. It is the utilization of this type of circuit that requires that the output voltage from the differential amplifier 180 be maintained at a value of zero, or some positive value. Furthermore, a field effect transistor is utilized due to its high input impedance which does not load down the signal source. Thus, better control is provided inasmuch as a positive voltage can be used as a signal without any need for going negative to cut off the transmission of current through the transistor.

The input signal appearing across lead resistor 110 is transmitted through transistor 100 and begins to charge capacitor 106. Unijunction transistor 102 acts as an open circuit until the charge on capacitor 106 equals or exceeds a certain value which is a function of the intrinsic standoff ratio for the transistor 102, then the transistor 102 acts as a short circuit to permit the flow of current through primary transformer coil 112 in the direction from (+) to (−) as indicated. This current continues to flow until the charge on the capacitor 106 falls to the value which turns off transistor 102. This section A of the circuit comprises a voltage to frequency converter with the approximate relationship:

$$f \alpha (V_p - V_{in})$$

where $f$ is frequency
$V_{in}$ is input voltage
$V_p$ is FET pinchoff voltage

The coil induced in the primary transformer coil 112 is then induced in the secondary transformer coil 116 to actuate section B of the circuit which is the power switch portion. The power switch comprises the PNP transistor 118 which has a silicon controlled rectifier 120 connected in series with the collector thereof, and the secondary transformer winding 116 connected between the gate and the cathode of the silicon controlled rectifier 120. The transistor 118 is initially biased in its conductive state and current flows from the voltage source 124 to the emitter through the base of the transistor 118 to resistor 122 to the common lead 62. When current flows from plus to minus as indicated through primary transformer coil 112, then current is induced in secondary transformer coil 116 from plus to minus as shown to render the silicon controlled rectifier 120 conductive. Current then flows from the D.C. source 124 through the transistor 118 from the emitter to the collector through silicon controlled rectifier 120 through resistor 90 through diode 92 and ultimately to the servomotor 46 so long as the silicon controlled rectifier 120 is in its conductive state. Simultaneously therewith, the conduction of the silicon controlled rectifier 120 supplies current to the relaxation oscillator portion C of the circuit. This is accomplished by current flow through diode 138 through resistors 142 and 144 to charge capacitor 146. Initially, prior to the conduction of rectifier 120, the base electrode B of transistor 118 is approximately at the voltage of the D.C. source 124. Meanwhile transistor 132 acts as an open circuit until the charge on capacitor 148 equals or exceeds a certain value, then transistor 132 acts as a short circuit to permit the flow of current from capacitor 146 through resistor 136. When transistor 132 conducts, voltage appears across resistor 136 with the polarity as indicated. The capacitor 134 between the base terminal B1 of transistor 132 and the base B of transistor 118 conducts for the duration of the pulse to drive the base B of transistor 118 more positive and renders transistor 118 nonconductive. With transistor 118 nonconductive, no current flows through the silicon controlled rectifier 120 to the motor 46 and upon the cessation of current the silicon controlled rectifier 120 returns to its nonconducting state. When capacitor 134 returns to its nonconducting state upon the completion of the pulse, the transistor 118 is again biased to its conductive state and the silicon controlled rectifier 120 remains nonconductive until it receives another induced pulse from primary transformer coil 112. This serves to equate a bias pulse with a hash regulator or arc voltage control pulse. The pulse that appears at the anode of diode 92 provides an input to the long time constant integrator section D. The pulse appears as an increase in voltage across the integrating circuit including resistor 152 connected in series with the parallel combination of capacitor 154 and resistor 156. The input pulse charges capacitor 154 which then slowly discharges through resistor 156. During the charge and discharge cycle, gate terminal G of field effect transistor 150 becomes more positive with respect to the ground lead C. As the gate terminal G of transistor 150 becomes more positive, so does the source terminal S thereof. This increase in voltage appears across load resistor 162 and the D.C. output is proportional to the pulse rate appearing on the anode of diode 92. This output is fed into the noninverting input terminal 2 of differential amplifier 180 through current limiting resistor 184. The output of the differential amplifier 180 at terminal 6 thereof becomes more positive by some gain factor which is a function of the values of the resistances of resistors 184 and 196. This output is then fed through diode 206 at which point it is mixed with the output from diode 210 of the limiting circuit H. As the output of differential amplifier 180 goes more positive, the frequency of oscillation of the voltage to frequency converter section A decreases and approaches zero. This is due to the frequency relation established previously in which $f\alpha(V_p - V_{in})$, where $f$ is frequency, $V_{in}$ is input voltage, and $V_p$ is FET pinchoff voltage, inasmuch as the input voltage approaches the pinchoff voltage of the field effect transistor 100.

In summary it can be seen that the pulses which are derived from some electrical characteristic of the consumable electrode furnace originally establish a rotating condition for the servomotor 46; these pulses are then sensed by a long time constant integrator section F; after a time delay period, the output proportional to the pulse rate sensed actuates a differential amplifier to provide some gain factor; the output of the differential amplifier being mixed with a signal from a limiting circuit H; the mixed signal thus obtained providing a D.C. voltage signal for a voltage to frequency converter section A; the pulses thus obtained actuating a power switch section B; the duration or "on" time of the power switch section being determined by a relaxation oscillator section C; the pulses thus obtained being added to the original pulses from the consumable electrode furnace control system; the pulses thus obtained also supplying a second long time constant integrator section D; the output of the last mentioned differential integrator section providing a noninverting input for the differential amplifier 180 to thereby drive the output more positive and ultimately decrease the frequency of pulses from the voltage to frequency converter section A.

In effect, the circuit acts as a slow response pulse multiplier by contributing a set percentage of the total pulses required to maintain the desired feedrate. The addition of the bias pulses serves to allow operation of the electrode at an arc gap where the unbiased hash or arc voltage pulses are sporadic and infrequent. The auto set bias feedrate circuit, by adding pulses in direct proportion to the long time average of the hash pulses, provides a more uniform drive rate and furthermore adds inertia for overriding temporary inconsistencies in the control signal.

While there has been shown and described a specific embodiment according to the invention, it will be readily apparent to those skilled in the art that various changes in form and arrangement of parts may be made to suit requirements without departing from the spirit and scope of the invention.

We claim:
1. In a system in which a pulsed output is produced proportional to a variable of the system to control the system and in which temporary abnormal cessations of the variable occur, the combination of:
   (a) means for sensing the pulse rate of the output signal;
   (b) means responsive to said output signal to generate pulses increasing in rate for a predetermined time period until the generated pulse rate is proportional to the pulse rate of said output signal;
   (c) mixing means for adding said generated pulses to said output signal pulses;
   (d) means for controlling said variable in response to the total pulses from said mixing means; and
   (e) means for controlling said system by said generated pulses after the cessation of said output signal, the rate of said generated pulses decreasing over said predetermined time period to thereby maintain control of said system for the duration of the temporary abnormal cessation of the variable.

2. In a consumable electrode furnace of the type in which an arc is struck between a consumable electrode and a molten pool of metal beneath it, and in which an electrically controlled motor device is employed to move the electrode downwardly toward the molten pool as it is consumed, the combination comprising:
   (a) means for producing a pulsed output proportional to an electrical characteristic of the arc, the pulse rate of said pulsed output being proportional to said electrical characteristic;
   (b) a slow response pulse multiplier, said pulse multiplier being responsive to said pulsed output and generating pulses proportional in rate to the pulse rate of said pulsed output over a predetermined time period, said pulse multiplier including means for mixing said pulsed output and said generated pulses; and
   (c) means responsive to the total pulses for driving the electrode downwardly toward said molten pool whereby with the cessation of said pulsed output the electrode would continue downwardly for said predetermined time period as the pulse rate of said generated pulses decreases to zero.

3. The combination of claim 2 wherein said generated pulses comprise approximately 80% of said total pulses.

4. The combination of claim 2 wherein the electrical characteristic of the arc comprises the voltage across the arc gap.

5. The combination of claim 2 wherein the electrical characteristic of the arc is hash.

6. In a consumable electrode furnace of the type in which an arc is struck between a consumable electrode and a molten pool of metal beneath it, and in which an electrically controlled motor device is employed to move the electrode downwardly toward the molten pool as it is consumed, the combination comprising:
   (a) means for producing a pulsed output at a pulse rate proprotional to an electrical characteristic of the arc;
   (b) means for generating bias pulses;
   (c) mixing means for adding said bias pulses and said pulsed output;
   (d) means for integrating the total pulses to produce a first direct current signal;
   (e) means for integrating the generated pulses to produce a second direct current signal;
   (f) differential amplifier means responsive to said first and said second direct current signal for producing a direct current output;
   (g) means coupling said direct current output to said pulse generating means, said pulse generating means generating said bias pulses at an increasing rate over a predetermined time period until the pulse rate of said bias pulses is proportional to the pulse rate of said pulsed output; and (h) means responsive to the total pulses for driving the eletcrode downwardly toward said molten pool, said pulse generating means on the cessation of said pulsed output providing bias pulses at a decreasing rate to maintain control of the electrode for said predetermined time period.

7. The combination of claim 6 wherein said mixing means includes a first isolating diode for transmitting said bias pulses, and a second isolating diode for transmitting the pulses from said pulsed output, the cathodes of said diodes being electrically connected.

8. The combination of claim 6 wherein said means for integrating the total pulses and said means for integrating the generating pulses have long time constants for providing slow response to pulse changes to provide a more uniform feed rate for the electrode.

9. The combination of claim 6 wherein said means for generating bias pulses includes power switch means in a normally deenergized condition, means for initiating the energization of said power switch means at a pulse rate proportional to the direct current output of said differential amplifier means, and time delay means for initiating the deenergization of said power switch means whereby the output of said power switch means provides said bias pulses.

10. The combination of claim 9 wherein said power switch means includes a transistor normally biased in its conductive condition, said transistor having a silicon controlled rectifier in series with its collector to emitter path.

References Cited

UNITED STATES PATENTS

| | | | |
|---|---|---|---|
| 3,143,587 | 8/1964 | Buehl | 13—3 |
| 3,186,043 | 6/1965 | Murtland et al. | 13—13 X |
| 3,356,921 | 12/1967 | Bradford, et al. | 318—19 XR |

BERNARD A. GILHEANY, *Primary Examiner.*

R. N. ENVALL, JR., *Assistant Examiner.*